Aug. 31, 1954     J. L. PETTUS ET AL     2,687,883
FILM DRIVE AND FILTER SYSTEM
Filed Oct. 15, 1951     4 Sheets-Sheet 1

INVENTORS.
JAMES L. PETTUS
& ARTHUR C. ALBEE
BY

ATTORNEY.

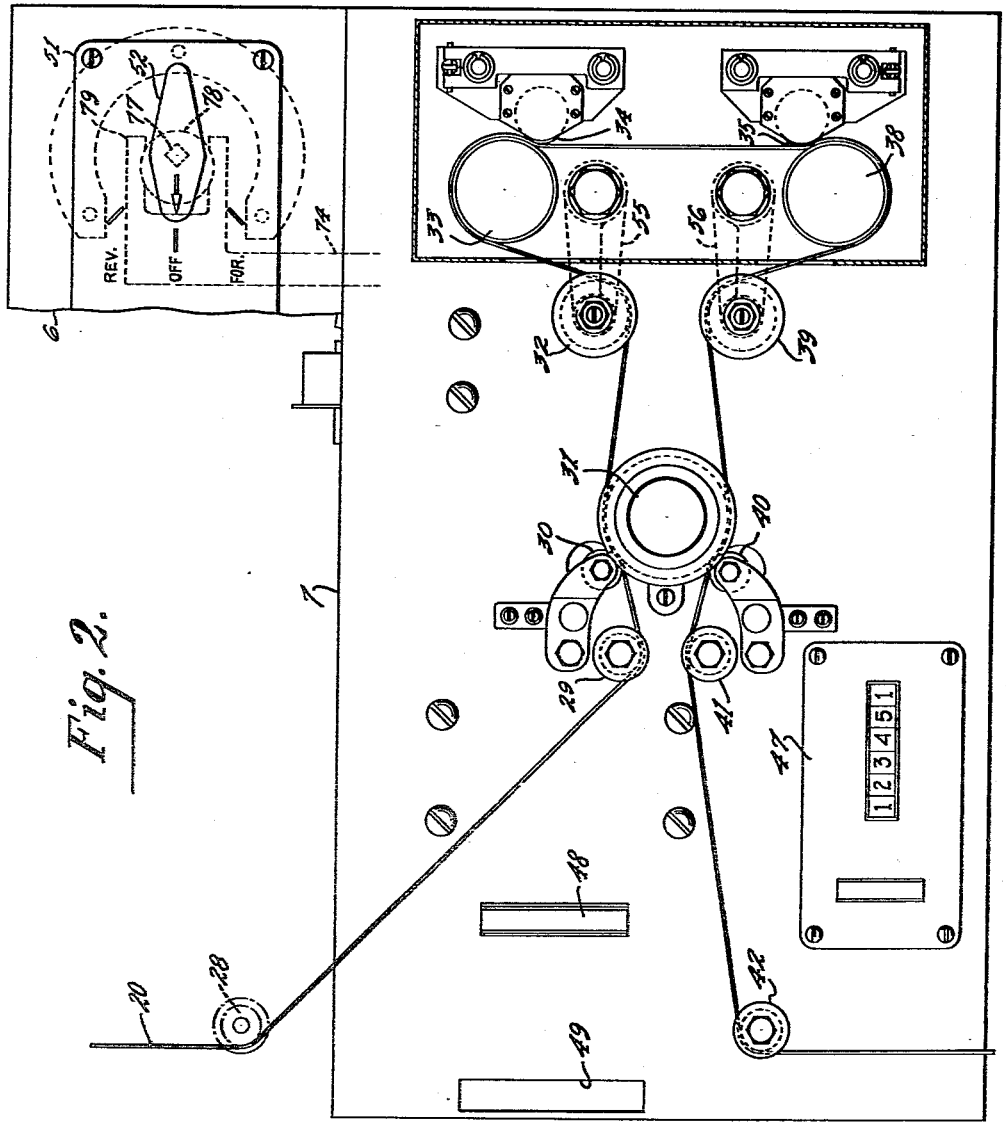

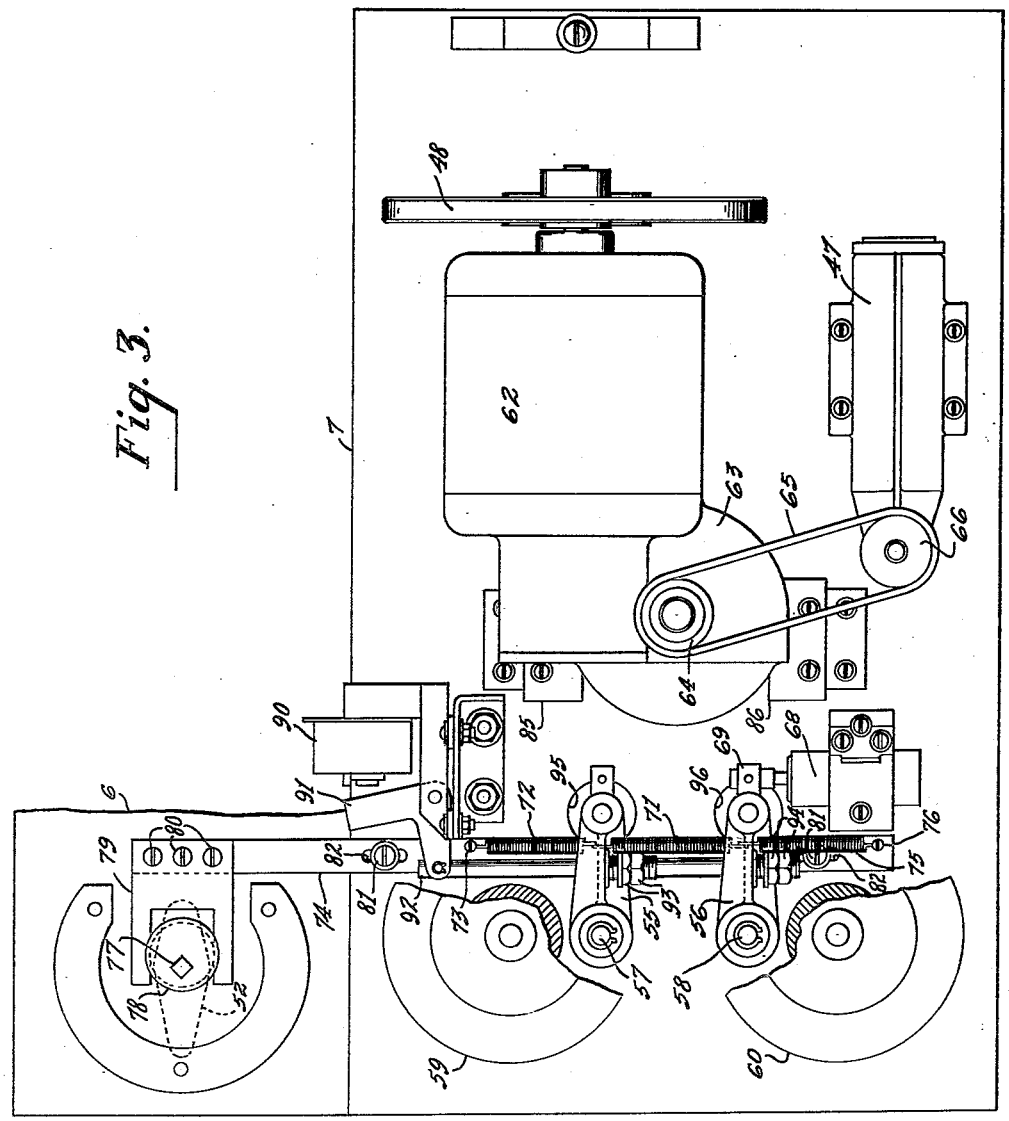

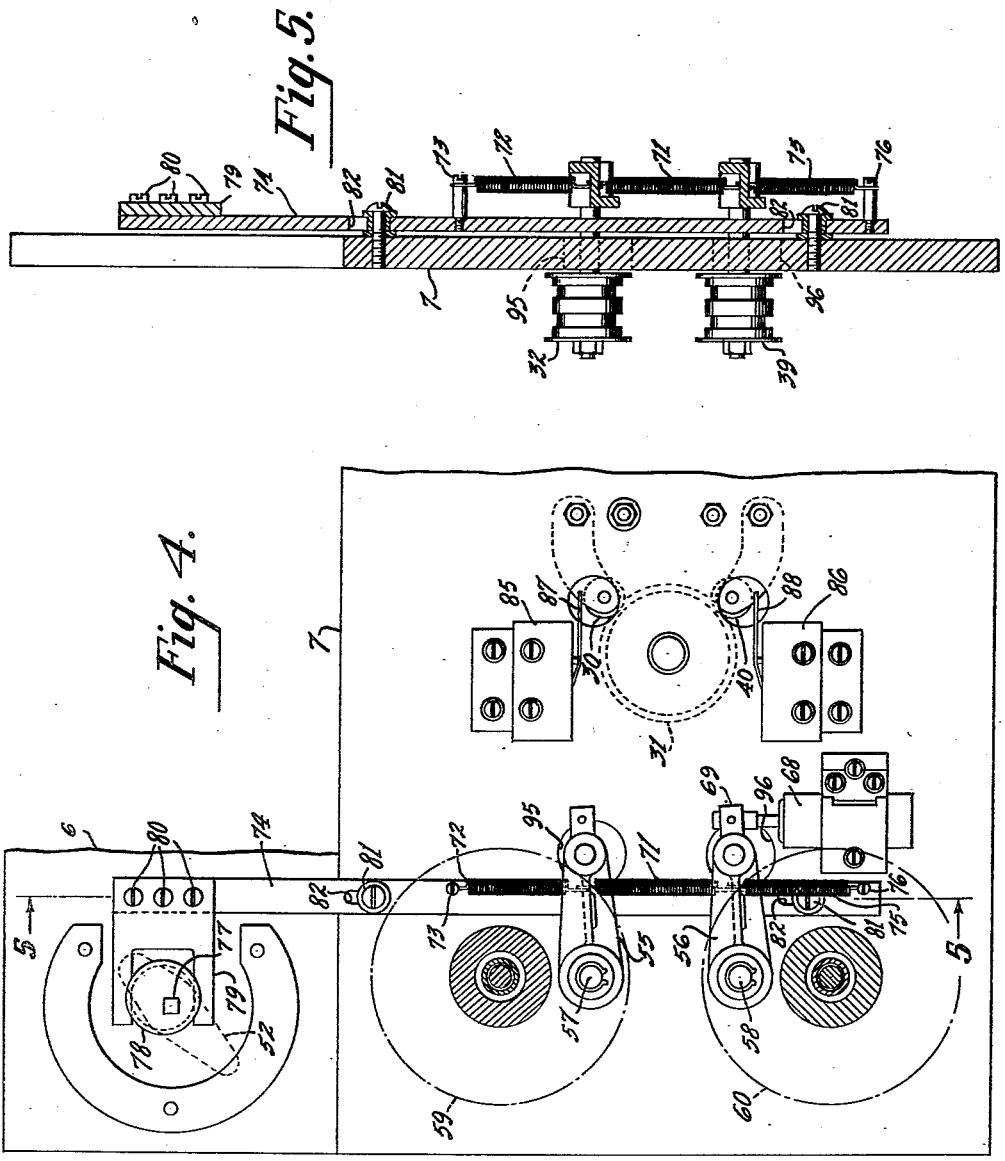

Patented Aug. 31, 1954

2,687,883

UNITED STATES PATENT OFFICE 2,687,883

FILM DRIVE AND FILTER SYSTEM

James L. Pettus, Encino, and Arthur C. Albee, Hollywood, Calif., assignors to Radio Corporation of America, a corporation of Delaware Application October 15, 1951, Serial No. 251,384

10 Claims. (Cl. 271—2.3)

This invention relates to film driving apparatus, and particularly to a reversible film advancing mechanism for a sound recorder and reproducer whereby the same optimum degree of filtering is obtained when the film is advanced in either direction.

Many types of film drive systems are known for advancing photographic film, the principal features of which have been incorporated in magnetic film drives. In photographic film systems, the film is generally advanced in one direction only during the recording and reproducing operations. With magnetic film, however, sound may be recorded thereon and reproduced therefrom when the film is advanced in either direction. Thus, it is necessary that the same uniform and constant speed of advancement of the film be obtained at the recording and reproducing points when the film is advanced in either direction.

The present invention is directed to a symmetrical type of magnetic film recorder and reproducer drive, such as disclosed and claimed in co-pending U. S. application, Ser. No. 201,658, filed December 19, 1950, wherein a pair of tensioned rollers are in film loops between the inertia rollers and the film advancing sprocket. The same general mechanical filtering system for the tensioning rollers is employed in the present invention, provision being made to vary the tensioning of the different rollers to obtain the optimum in film motion stability with the film running in either direction. The variation in the filtering is accomplished automatically with the reversal of the motor driving the film advancing sprocket.

Another feature of the invention is the automatic positioning of the film tensioning rollers to fixed positions to insure the proper length loop between the sprocket and inertia drums when the recorder or reproducer is ready for operation.

The principal object of the invention, therefore, is to facilitate the recording and reproducing of sound.

Another object of the invention is to provide an improved magnetic tape or film sound recorder and reproducer.

A further object of the invention is to provide an improved magnetic film drive which provides a particularly uniform film motion at the recording and reproducing points when the film is driven in either direction.

A still further object of the invention is to provide an improved filtering system which is automatically varied when the film is driven in different directions and to provide an automatic threading gauge for the film loops from the driving sprocket.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 2 is an elevational view of the recording and reproducing panel of the invention.

Fig. 3 is a rear view showing the driving motor and mechanical filter elements of the invention.

Fig. 4 is a rear view showing the filter elements in one adjusted position and the pad roller switches, and Fig. 5 is a detailed view taken along the line 5—5 of Fig. 4.

Figure 1:
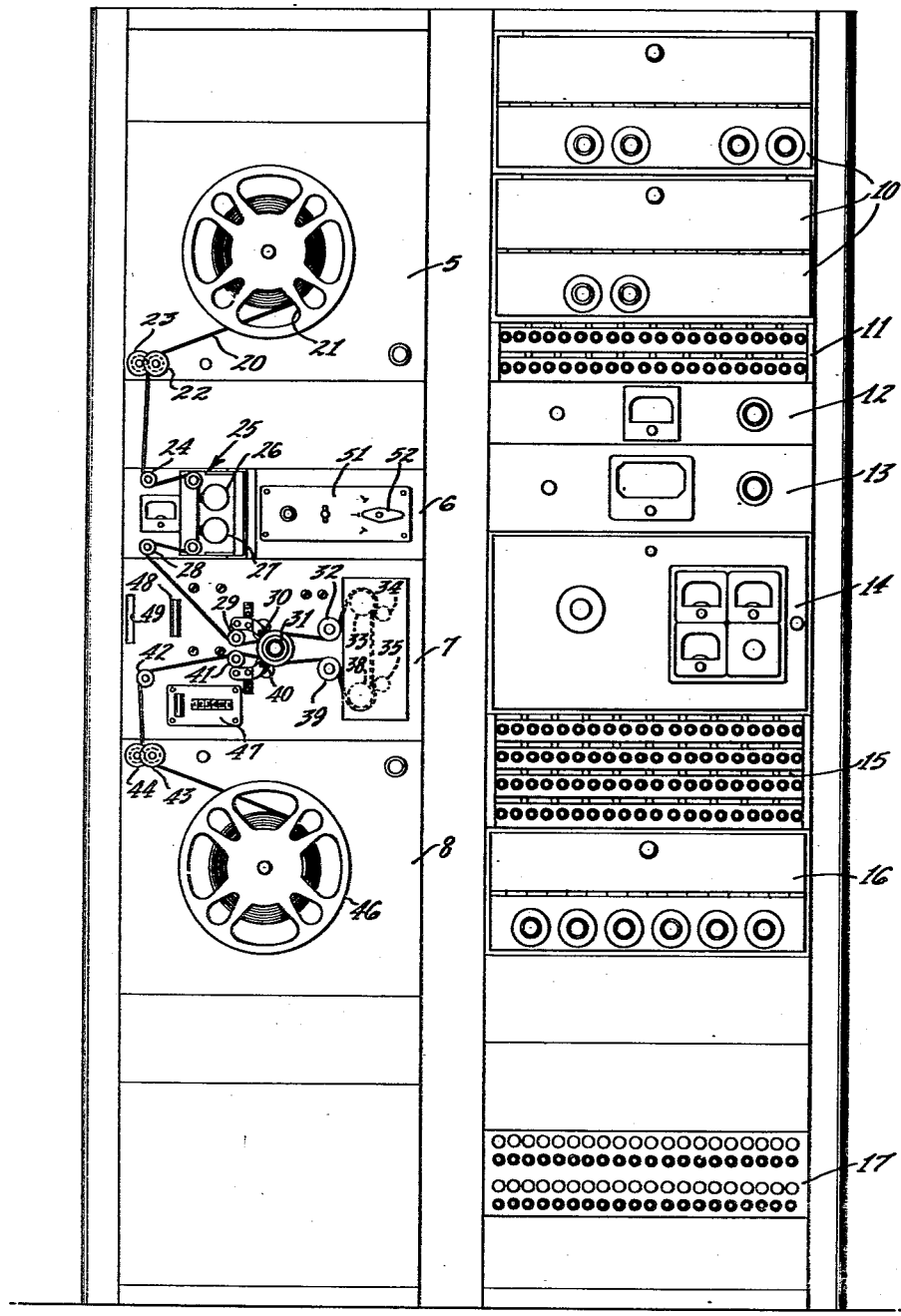
Fig. 1 is an elevational view of the film advancing mechanism and the control panel for the electrical apparatus therefor.

Referring now to the drawings, in which the same numerals identify like elements, the left-hand rack, shown in Fig. 1, has an upper reel panel 5, a switch panel 6, a recording and reproducing panel 7, and a reel panel 8. The right-hand rack is made up of panels 10 containing the recording amplifiers and controls therefor, a jack strip panel 11, a voltmeter panel 12, a volume indicator panel 13, an oscillator and control panel 14, a jack strip panel 15, a playback amplifier panel 16, and a fuse panel 17.

Referring now to the left-hand rack, a film 20 is shown coming from a reel 21, which may be either a take-up or supply reel, as will be described hereinafter, and passing around a sprung roller 22, which holds the film against a fixed roller 23. The movable roller 22 controls a switch in the energizing circuit for the motor driving or controlling reel 21, this motor being of the type described and claimed in co-pending U. S. application, Ser. No. 201,659, filed December 19, 1950. From rollers 22 and 23, the film passes around a guide roller 24 and into an erasing unit 25 having two erasing heads 26 and 27 in series, as disclosed and claimed in Rettinger U. S. application, Ser. No. 182,316, filed August 30, 1950. The film then passes around guide rollers 28 and 29 under an adjustable pad roller 30, over sprocket 31, around film tensioning roller 32, an inertia drum 33 having a flywheel mounted on the shaft thereof, and then past magnetic heads 34 and 35. The arrangement of the heads 34 and 35 (see Fig. 2) is the same as that shown in co-pending U. S. application, Ser. No. 201,658, mentioned above. The film then passes around an inertia roller 38 having a flywheel on the shaft thereof, around a film tensioning roller 39, a sprocket 31, under an adjustable pad roller 40, guide rollers 41 and 42, and between movable and fixed rollers 43 and 44, respectively, to a reel 46 which may either be a take-up or supply reel, depending upon the direction of film advancement.

Other apparatus shown in this rack is the footage counter 47, motor flywheel 48, and an opening 49 for the flywheel of a different type of motor. On panel 6 is a switch plate 51, which has a switch lever 52 shown in normal or off position. Movement of the lever in one direction advances the film from reel 21 to reel 46, and movement of the lever in the opposite direction advances the film from reel 46 to reel 21.

Referring now to Figs. 2, 3, and 4, the tensioning rollers 32 and 39 are mounted on respective arms 55 and 56 pivoted on shafts 57 and 58. In Figs. 3 and 4, flywheels 59 and 60 for the respective drums 33 and 38 are shown. The motor for driving the sprocket 31 is shown at 62, together with a reduction gear box 63. On one end of the sprocket shaft is a pulley 64, which drives a belt 65 around a pulley 66 of the footage counter 47.

The filter system for the rollers 32 and 39 is composed of a dashpot 68 connected to an extension 69 of the arm 56. Another component of the mechanical filter for the rollers 32 and 39 is a spring 71 interconnecting the arms 55 and 56 and urging the rollers 32 and 39 together to tighten the film loops between the sprocket 31 and the drums 33 and 38, respectively. A second spring 72 is shown connected between the arm 55 and an anchor 73 near the center of bar 74. A third spring 75 is shown connected to the arm 56 and to an anchor 76 on the end of the bar 74. For optimum operation of the filter, the spring 71 is approximately three times as strong as the springs 72 and 75 when the switch arm 52 is in a normal or off position, as shown in Figs. 2 and 3, while the tensions of the springs 72 and 75 are substantially the same when the switch is in this position. However, if the switch 52 is thrown to advance the film from reel 21 to reel 46, the springs 72 and 75 are provided with different tensions.

To explain this operation, reference is made to Fig. 4, wherein the switch arm 52 is shown mounted on a square shaft 77, which rotates an eccentric cam 78 having a U-shaped follower 79. The follower 79 is attached to the bar 74 by screws 80, and in Fig. 4, the bar has been moved longitudinally in an upwardly direction. The bar 74 is held in position by screws 81 positioned in elongated holes 82 so that the bar is slidable longitudinally in either direction from its position shown in Fig. 3. Now, when the film is running downwardly, the tension of the spring 72 on the arm 55 has been increased, and the tension on the spring 75 on the arm 56 has been decreased. By these varying tensions, as explained in copending U. S. application, Ser. No. 201,658, mentioned above, the proper tension is put in the respective loops to provide the most stable film motion at heads 34 and 35 with the film running from reel 21 to reel 46.

Should the switch handle 52 be thrown to the opposite position so that the film travels upwardly from the reel 46 to reel 21, the bar 74 is now shifted downwardly and the increased tension is placed in spring 75 against arm 56, while the tension of spring 72 is decreased on the arm 55, the rollers 32 and 39 still maintaining their symmetrical disposition with respect to the sprocket 31 and the drums 33 and 38. Thus, regardless of the direction of advancement of the film 20 through the recorder and reproducer, optimum mechanical filtering of the film motion past the heads will be obtained at all times. In one direction of advancement of the film, the head 34 may be a record head and the head 35 a monitoring or reproduce head, and when the film is advanced in the reverse direction, the function of these two heads will be interchanged by the necessary switches.

Another feature of applicant's invention is the provision of a film length gauge for threading the film loop between the sprocket 31 and the drums 33 and 38 so that there is always the same and proper amount of film between these elements of the mechanism. This is accomplished by the switches 85 and 86, which have levers 87 and 88 in contact with a portion of the arms of the pad rollers 30 and 40. Thus, if either of the pad rollers 30 and 40 is raised from the sprocket 31, the respective switch contacts will be made to energize solenoid 90. (See Fig. 3.) The solenoid 90 has a crank armature 91, one end of which is attached to a rod 92 having thereon a first pair of adjustable nuts 93 and a second pair of adjustable nuts 94. It will be noted that the shafts of the tensioning rollers 32 and 39 are movable in holes 95 and 96, respectively, in the mounting panel 7, and their normal position is substantially at the center of the holes. When the solenoid 90 is energized, however, the nuts 93 and 94 are moved against the arms 55 and 56, respectively, to move the shafts of the rollers 32 and 39 against the upper portion of the holes 95 and 96 in the panel 7. The rollers 32 and 39 are thus held in a fixed position. The film is now threaded around the sprocket 31 and the pad roller 30 is closed, which opens the switch 85. However, the solenoid 90 remains energized because the contact of switch 86 is still closed, the switches 85 and 86 being in parallel. The film is then wrapped tightly around roller 32, around drum 33, around drum 38, and over roller 39 to the sprocket 31, the film being tightly drawn before the pad roller 40 is closed. The closing of pad roller 40 breaks the contact of switch 86, which allows the rod 92 to take the position shown in Fig. 3. This releases the roller arms 55 and 56 and the springs 71, 72, and 75 allow the rollers 32 and 39 to center themselves. The system is then ready to start.

The reels 21 and 46 are driven by torque motors such as described and claimed in U. S. Patent No. 2,657,870 of November 3, 1953, the motors being under control of the switches controlled by rollers 22, 23, 43, and 44, and the switch 52, the motor 62 for the sprocket 31 being solely under control of switch 52. After adjustment, the sprocket 31 may be of the free-wheeling type, such as disclosed and claimed in U. S. Patent No. 2,644,562 of July 7, 1953, whereby the sprocket may be disconnected from the motor 62 during the positioning of the film at any particular point at the heads 34 and 35.

The above system, therefore, has two important features which have been found to improve the film drive for magnetic sound recorders and reproducers. As mentioned above, these features include the automatic varying of the film motion filter to provide the optimum filtering action when the film is driven in either direction, and the automatic positioning of the movable tensioning rollers for properly gauging the amount of film in the film loop when threading the machine.

We claim:

1. A film drive system comprising a drive sprocket, a pair of inertia drums, a pair of film tensioning rollers, the film passing on one side of said sprocket, around one of said tensioned rollers, around one of said drums, around said other drum, around said other roller, and back to another side of said sprocket, a spring for resiliently urging said rollers together to tension said film, a second spring urging said rollers in one direction, a third spring urging said rollers in the opposite direction, and movable means to which one end of each of said second and third springs is attached for reducing the tension in said second spring and simultaneously increasing the tension in said third spring when said means is moved in one direction and said film is advanced in one direction by said sprocket and for reducing the tension in said third spring and increasing the tension in said second spring when said means is moved in the opposite direction and said film is advanced in the opposite direction.

2. A film drive system comprising a drive sprocket, a pair of inertia drums, a pair of film tensioning rollers, the film passing on one side of said sprocket, around one of said tensioned rollers, around one of said drums, around said other drum, around said other roller, and back to another side of said sprocket, a spring for resiliently urging said rollers together to tension said film, a second spring urging said rollers in one direction, a third spring urging said rollers in the opposite direction, means for reducing the tension in said second spring and simultaneously increasing the tension in said third spring when said film is advanced in one direction by said sprocket and for reducing the tension in said third spring and increasing the tension in said second spring when said film is advanced in the opposite direction, said last mentioned means including a bar parallel with the axes of said springs, said second and third springs having their respective ends connected to said bar, and rotatable switch means for longitudinally shifting said bar.

3. A film drive system comprising a drive sprocket, a pair of inertia drums, a pair of film tensioning rollers, the film passing on one side of said sprocket, around one of said tensioned rollers, around one of said drums, around said other drum, around said other roller, and back to another side of said sprocket, a spring for resiliently urging said rollers together to tension said film, a second spring urging said rollers in one direction, a third spring urging said rollers in the opposite direction, means for reducing the tension in said second spring and simultaneously increasing the tension in said third spring when said film is advanced in one direction by said sprocket and for reducing the tension in said third spring and increasing the tension in said second spring when said film is advanced in the opposite direction, a motor for driving said sprocket, a reversing switch for said motor, said last mentioned means including a bar parallel with the axes of said springs, said second and third springs having their respective ends connected to said bar, and means connecting said bar to said switch for longitudinally moving said bar to a position determined by the position of said switch.

4. A film drive system comprising a drive sprocket, a pair of inertia drums, a pair of film tensioning rollers, the film passing on one side of said sprocket, around one of said tensioned rollers, around one of said drums, around said other drum, around said other roller, and back to another side of said sprocket, a spring for resiliently urging said rollers together to tension said film, a second spring urging said rollers in one direction, a third spring urging said rollers in the opposite direction, means for reducing the tension in said second spring and simultaneously increasing the tension in said third spring when said film is advanced in one direction by said sprocket and for reducing the tension in said third spring and increasing the tension in said second spring when said film is advanced in the opposite direction, pad rollers on said sprocket, switches actuated by movement of said pad rollers, a solenoid energized by the closing of said switches, and means for fixedly positioning said tensioning rollers upon energization of said solenoid.

5. A film drive and filter system comprising a sprocket adapted to advance film in either of two directions, a motor for driving said sprocket, a reversing switch for said motor, a pair of inertia drums, a pair of rollers, said film being threaded tightly from said sprocket around said drums and rollers and back to said sprocket, pivoted arms for said rollers, resilient means attached to said arms urging said rollers together, a separate resilient element having one end attached to each roller for urging said rollers apart, damping means attached to one of said arms, movable means attached to said switch and to the other ends of said separate resilient elements for simultaneously shifting said last mentioned ends in opposite directions for varying the tension on said arms which urge said arms apart in accordance with the direction of film travel.

6. A film drive and filter system in accordance with claim 5, in which pad rollers are provided for said sprocket, together with switches adapted to be closed by the opening of said pad rollers, a solenoid, and means adapted to contact said arms and movable by the energization of said solenoid to fixedly position said arms and rollers.

7. A variable mechanical filter for stabilizing film travel comprising a film advancing sprocket, a pair of fixed inertia drums, a pair of movable film tensioning rollers intermediate said sprocket and said drums, said film being in a tight loop from said sprocket around said rollers and drums, resilient means for urging said rollers together with a certain force, a resilient element for urging one of said rollers in one direction with a certain force less than said first mentioned force when the film is traveling in one direction, a resilient element for urging the other of said rollers in the opposite direction with a force less than either of said first and second mentioned forces when said film is traveling in said one direction, and movable means to which one end of each of said resilient elements is attached for simultaneously shifting the position of said resilient elements for reversing the forces exerted by said resilient element upon reversal of said direction of film travel.

8. A variable mechanical filter for stabilizing film travel comprising a film advancing sprocket, a pair of fixed inertia drums, a pair of movable film tensioning rollers intermediate said sprocket and said drums, said film being in a tight loop from said sprocket around said rollers and drums, resilient means for urging said rollers together with a certain force, resilient means urging one of said rollers in one direction with a certain force less than said first mentioned force when the film is traveling in one direction, resilient means urging the other of said rollers in the opposite direction with a force less than either of said first and second mentioned forces when said film is traveling in said one direction, and means for reversing the forces exerted by said second and third mentioned resilient means upon reversal of said direction of film travel, said last mentioned means including a bar member movable along an axis substantially parallel with axes of said resilient means, the ends of said second and third mentioned resilient means being connected thereto.

9. A variable mechanical filter for stabilizing film travel comprising a film advancing sprocket, a pair of fixed inertia drums, a pair of movable film tensioning rollers intermediate said sprocket and said drums, said film being in a tight loop from said sprocket around said rollers and drums, resilient means for urging said rollers together with a certain force, resilient means urging one of said rollers in one direction with a certain force less than said first mentioned force when the film is traveling in one direction, resilient means urging the other of said rollers in the opposite direction with a force less than either of said first and second mentioned forces when said film is traveling in said one direction, means for reversing the forces exerted by said second and third mentioned resilient means upon reversal of said direction of film travel, adjustable pad rollers for said sprocket, switches closed by the removal of said rollers from said sprocket, and means for moving and holding said rollers in fixed positions when at least one of said switches is closed.

10. A variable mechanical filter for stabilizing film travel comprising a film advancing sprocket, a pair of fixed inertia drums, a pair of movable film tensioning rollers intermediate said sprocket and said drums, said film being in a tight loop from said sprocket around said rollers and drums, resilient means for urging said rollers together with a certain force, resilient means urging one of said rollers in one direction with a certain force less than said first mentioned force when the film is traveling in one direction, resilient means urging the other of said rollers in the opposite direction with a force less than either of said first and second mentioned forces when said film is traveling in said one direction, means for reversing the forces exerted by said second and third mentioned resilient means upon reversal of said direction of film travel, adjustable pad rollers for said sprocket, switches closed by the removal of said rollers from said sprocket, and means for moving and holding said rollers in fixed positions when at least one of said switches is closed, said last mentioned means including a solenoid having a movable armature, a rod connected to said armature, and means on said bar for moving said rollers to fixed positions when said solenoid is energized.

References Cited in the file of this patent

UNITED STATES PATENTS

| Number | Name | Date |
| --- | --- | --- |
| 1,368,798 | Henry | Feb. 15, 1921 |
| 1,831,562 | Heisler | Nov. 10, 1931 |
| 1,885,989 | Charlin et al. | Nov. 1, 1932 |
| 2,108,337 | Hoffman | Feb. 15, 1938 |
| 2,153,214 | Tondreau | Apr. 4, 1939 |
| 2,328,597 | Woolf | Sept. 7, 1943 |
| 2,349,018 | Tasker | May 16, 1944 |
| 2,442,400 | Collins | June 1, 1948 |
| 2,542,590 | Stone | Feb. 20, 1951 |

FOREIGN PATENTS

| Number | Country | Date |
| --- | --- | --- |
| 370,001 | Great Britain | June 1, 1939 |
| 506,654 | Great Britain | June 1, 1939 |
| 748,689 | France | Apr. 25, 1933 |